June 11, 1968   K. L. PICKARD   3,387,761
INTERNAL ALIGNMENT CLAMP
Filed Feb. 10, 1966   3 Sheets-Sheet 1

Kenneth L. Pickard
INVENTOR.

BY *Clarence A. O'Brien*
*and Harvey B. Jacobson*
Attorneys

June 11, 1968 K. L. PICKARD 3,387,761
INTERNAL ALIGNMENT CLAMP
Filed Feb. 10, 1966 3 Sheets-Sheet 2
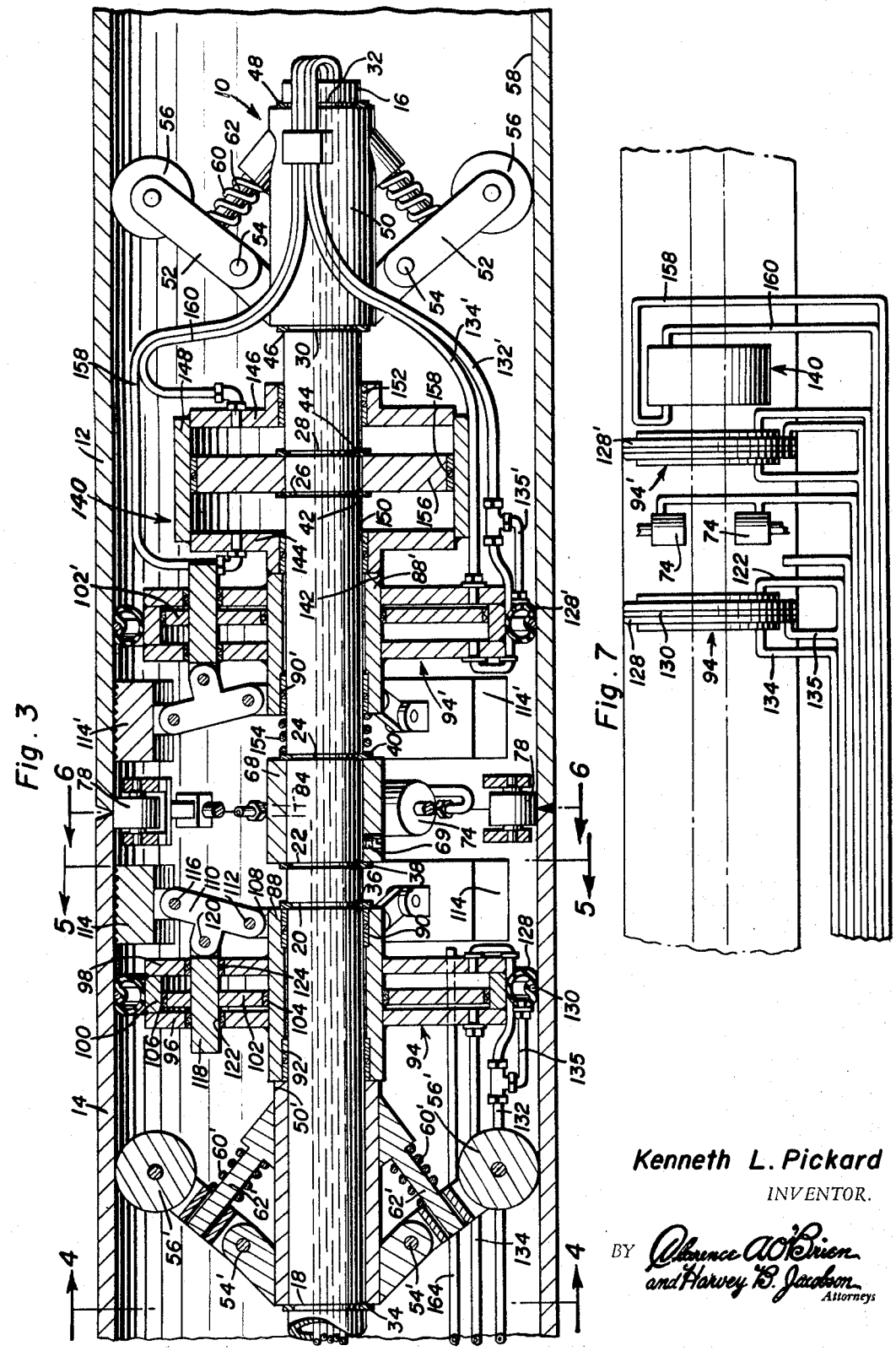
Kenneth L. Pickard
INVENTOR.

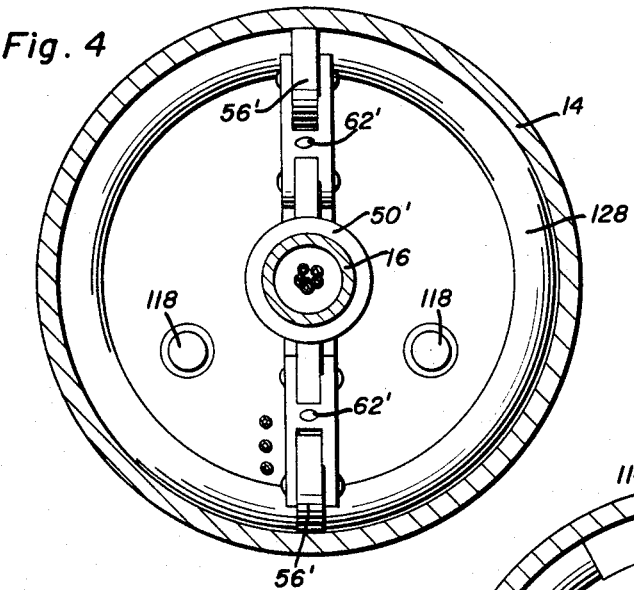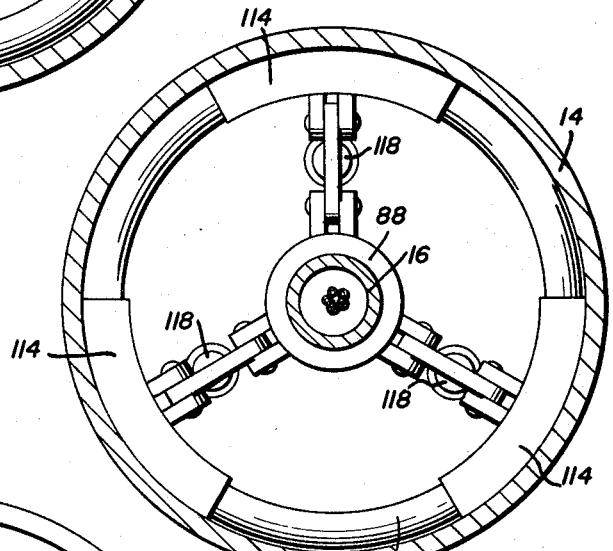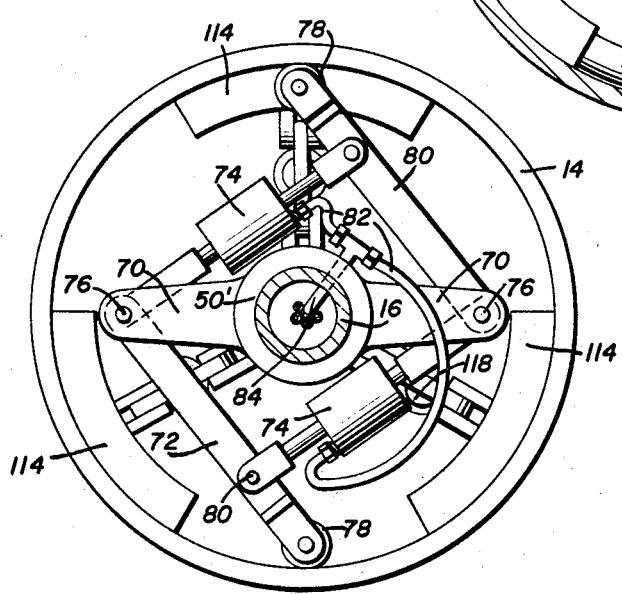

United States Patent Office 3,387,761
Patented June 11, 1968

3,387,761
INTERNAL ALIGNMENT CLAMP
Kenneth L. Pickard, Bakersfield, Calif. (4930 Hazeltine Ave., Apt. 6, Sherman Oaks, Calif. 91403)
Filed Feb. 10, 1966, Ser. No. 526,453
15 Claims. (Cl. 228—42)

This invention relates to a novel and useful elongated clamp assembly and more specifically to a clamp assembly defining a longitudinal center axis and adapted to be disposed within a pair of closely adjacent and substantially end aligned pipe sections which are to be joined together by welding. The clamp assembly includes means by which the inner surfaces of the adjacent ends of the pipe sections may be engaged and supported in exact end aligned relation and also means for longitudinally shifting the pipe sections supported thereby relative to each other.

The clamp assembly additionally includes longitudinally spaced annular seal means adapted to form a fluid-tight seal with the inner surfaces of the pipe sections to be joined at points spaced longitudinally thereof from the abutted ends thereof in a manner completely sealing the area within the pipe sections between the annular seal means. Further, the clamp assembly also includes means for admitting an inner atmosphere into the area between the annular seal means. Finally, the clamp assembly also includes means for admitting an inner atmosphere into the area between the annular seal means thereof and roller means movable about the internal surface of the end aligned pipe sections in rolling engagement therewith immediately adjacent the abutted ends of the pipe sections whereby the end edge portions of the pipe sections abutted together may be evenly heated to a malleable or pliable state from the exterior thereof and the pipe sections may then be shifted longitudinally relative and toward each other so as to autogeneously weld the pipe sections together in a manner termed "pressure welding."

The clamp assembly of the instant invention is adapted to be utilized specifically in combination with the apparatus for pressure welding pipe.

This apparatus for pressure welding pipe is adapted to be supported from one of the pipe sections to be joined together and includes means for rotatably supporting one or more heating means for rotation about the butt joint between the pipe sections to be joined together. Further, the apparatus for pressure welding pipe additionally includes means for enclosing an annular area about the end abutted ends of the pipe sections to be joined by welding and means for admitting an inert atmosphere into this area whereby the "pressure weld" being formed will not be adversely affected by the ambient atmosphere disposed outside of the area enclosed by the welding apparatus.

The main object of this invention is to provide an internal alignment clamp which is adapted to support a pair of pipe sections in end aligned and abutted relation relative to each other.

A further object of this invention is to provide a clamp in accordance with the preceding object and including means operable to longitudinally shift the pipe sections supported thereby relative to each other.

Yet another object of this invention is to provide a clamp including seal means adapted to form a fluid-tight seal with the internal surfaces of the pipe sections to be joined at points spaced longitudinally of the pipe sections from the abutted ends thereof in a manner completely sealing the area between the seal means from the ambient atmosphere within the pipe sections.

Yet another object of this invention is to provide means for admitting an inert atmosphere into the area within the pipe sections between the seal means of the clamp.

A further object of this invention is to provide a clamp in accordance with the preceding objects and including roller means movable about the internal surfaces of the associated end aligned pipe sections in rolling engagement therewith immediately adjacent the abutted ends of the sections whereby the adjacent end edges of the pipe sections, after being heated to a malleable or pliable state, may be maintained in perfect concentric relation relative to the coinciding longitudinal centerlines of the pipe sections to be welded together.

A final object of this invention to be specifically enumerated herein is to provide an internal alignment clamp in accordance with the preceding objects and which will conform to conventional forms of manufacture, be of simple construction and easy to use so as to provide a device that will be economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary longitudinal vertical sectional view of a pair of end aligned pipe sections taken substantially upon a plane passing through the longitudinal centerlines of the pipe sections and illustrating the internal alignment clamp of the instant invention disposed within the adjacent ends of the pipe sections and actuated in a manner to retain the adjacent ends in perfect end aligned relation;

FIGURE 2 is a fragmentary vertical sectional view similar to that of FIGURE 1 but illustrating the manner in which the pipe sections maintained in end aligned relation by the clamp assembly may be relatively longitudinally shifted into tight end abutting relation and the manner in which the seal means carried by the alignment clamp may be actuated to completely seal the interior portions of the pipe sections adjacent the end abutted edge thereof from the ambient atmosphere;

FIGURE 3 is an enlarged fragmentary longitudinal sectional view taken substantially upon the plane indicated by the section line 3—3 of FIGURE 2;

FIGURE 4 is a transverse sectional view taken substantially upon the plane indicated by the section line 4—4 of FIGURE 3;

FIGURE 5 is a transverse sectional view taken substantially upon the plane indicated by the section line 5—5 of FIGURE 3;

FIGURE 6 is a traverse sectional view taken substantially upon the plane indicated by the section line 6—6 of FIGURE 3; and FIGURE 7 is a diagrammatical view of the fluid actuating systems of the internal alignment clamp.

Figure 1:
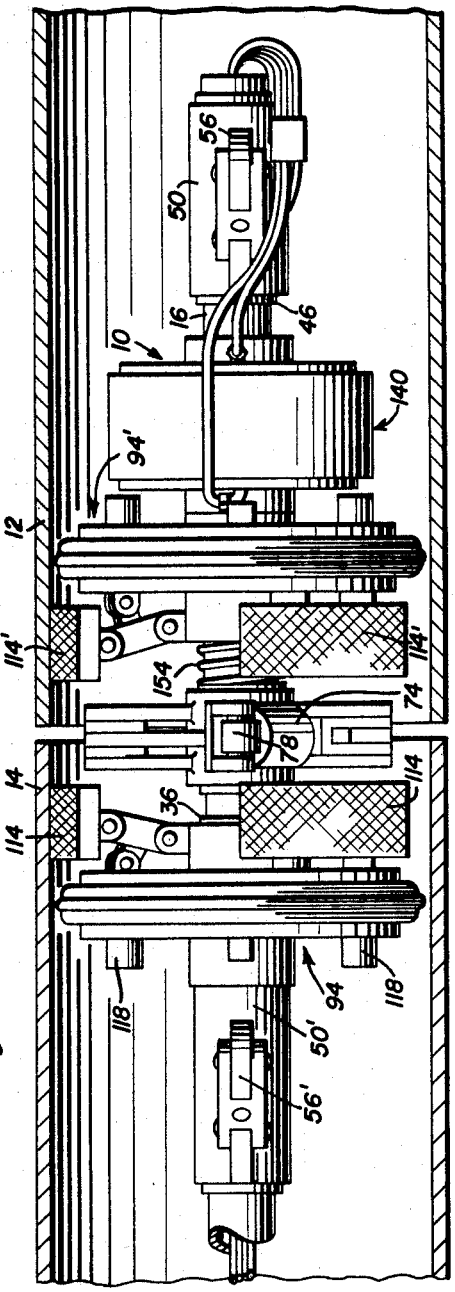
Figure 2:
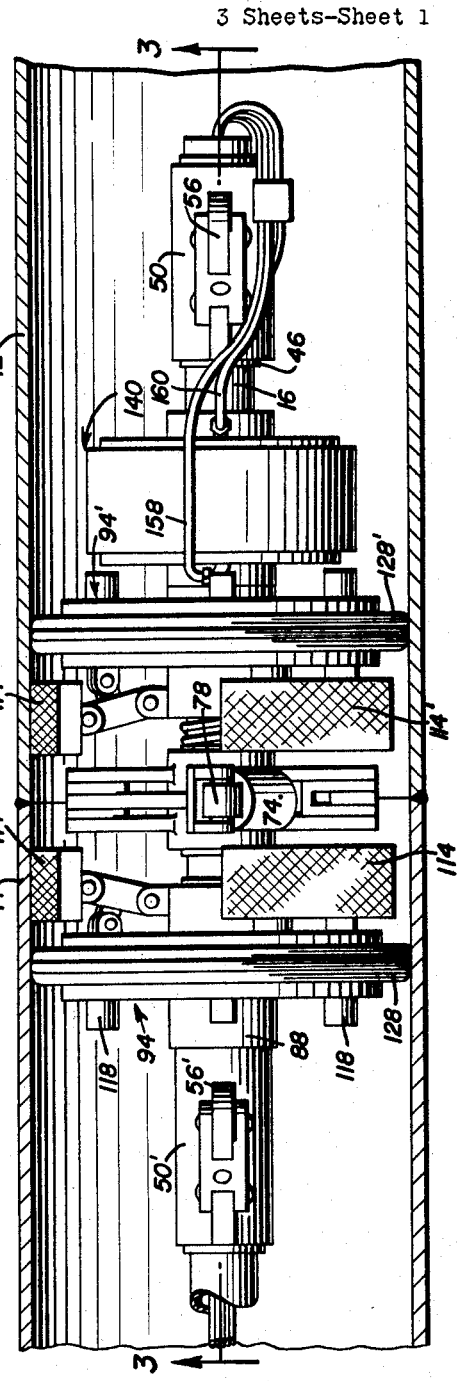

Referring now more specifically to the drawings, the numeral 10 generally designates the internal alignment clamp of the instant invention. The clamp 10 is illustrated in FIGURE 1 of the drawings as being disposed within the adjacent ends of a pair of end aligned pipe sections 12 and 14.

As can best be seen from FIGURE 3 of the drawings, the clamp 10 includes a main support pipe 16 having a plurality of circumferential grooves 18, 20, 22, 24, 26, 28, 30 and 32 formed therein in which there are seated slip rings 34, 36, 38, 40, 42, 44, 46 and 48, respectively.

A first support sleeve 50 is journaled on the support pipe 16 between the rings 46 and 48 and includes a pair of support arms 52 pivotally supported from the sleeve 50 at one pair of corresponding ends by means of suitable pivot fasteners 54. The other pair of corresponding ends of the support arms 52 have a pair of rollers 56 journaled therefrom. The rollers 56 are disposed in contact with the inner surfaces 58 of the pipe section 12 and each of the support arms 52 has its free end urged toward the remote ends of the support pipe 16 by means of a compression spring 60 disposed about a rod-like guide 62 carried by the support sleeve 50 at one end and slidingly received through a sleeve portion provided therefor in the corresponding support arm. One end of each compression spring is engaged with the corresponding support arm 52 and the other end of each spring 60 is engaged with the support sleeve 50.

A second support sleeve 50' substantially identical to the support sleeve 5 is rotatably journaled on the support pipe 16 on the side of the ring 34 adjacent the sleeve 50 and comprises a substantial duplicate of the sleeve 50 and its structural components have therefore been given prime numerals corresponding to the numerals given the similar components of the sleeve 50.

A center support sleeve 68 is mounted on the support pipe 16 between the rings 38 and 40 and includes a set-screw 69 engaged with the pipe 16 whereby the sleeve 68 is not only fixd in position on the pipe 16 against displacement longitudinally thereof but also against rotation thereabout.

The support sleeve 68 includes a pair of support arms 70 which project radially outwardly thereof from diametrically opposite portions of the sleeve 68 and the free ends of the arms 70 each have one end of an arm 72 and one end of an extendsible fluid motor 74 pivotally secured thereto by means of a pivot fastener 76. The free ends of the arm 72 each have a roller 78 journaled thereon and the other end of the fluid motors 74 remote from the pivot fasteners or pins 76 are pivotally secured to the free end portions of the arms 72 as at 80. The fluid motors 74 may each be of the type spring urged toward collapsed positions and have fluid lines 82 operatively connected thereto which are in turn communicated with a fluid supply line 84 passing generally radially through the sleeve 68 and the portion of the pipe 16 therebeneath and out the end of the pipe 16 remote from the sleeve 50 to a suitable source (not shown) of fluid under pressure.

Also supported from the support pipe 16 between the sleeve 50' and the ring 36 is a support sleeve 88 including seal means 90 and 92 at its opposite ends forming a substantially fluid-tight seal with the pipe 16. The sleeve 88 has an annular cylinder assembly generally referred to by the reference numeral 94 supported therefrom and including a pair of annular opposite end walls 96 and 98 interconnected by means of a cylindrical wall portion 100 at the outer peripheral edges of the end walls 96 and 98. An annular piston 102 is disposed within the cylinder assembly 94 and includes seal means 104 and 106 forming fluid tight seals with the outer surfaces of the sleeve 88 and the inner surfaces of the cylindrical wall portions 100, respectively. Further, the sleeve 88 includes a plurality of bifurcated mounts 108 spaced circumferentially thereabout between whose furcations one set of corresponding ends of a plurality of levers 110 are pivotally supported by means of pivot fasteners 112. Each of the levers 110 has arcuate gripping shoe or member 114 pivotally secured to its other end by means of a pivot fastener 116 and the mid-portion of each of the levers 110 has one end of a piston rod 118 pivotally secured thereto by means of a fastener 120, the piston rods 118 each being fixedly secured through the annular piston 102 and having its opposite ends slidably received through aligned apertures 122 and 124 formed through the end walls 96 and 98, respectively, and provided with suitable seal means forming fluid-tight seals between the end walls 96 and 98 and the piston rods 118.

A hollow and inflatable annular seal member 128 extends about the cylindrical wall portion 100 and is disposed between the latter and the internal surfaces of the pipe section 14 and has a centrally disposed tension band 130 entrained thereabout. A fluid supply line 132 is provided and extends between the cylindrical wall portion 100 and the seal member 28 and opens through the end wall 98 into the area disposed outwardly of the sleeve 88 between the end wall 98 and the annular piston 102. Further, an additional fluid supply line 135 is provided and opens through the end wall 96 into the area disposed outwardly of the sleeve 88 between the end wall 96 and the annular piston 102. Still further, a branch fluid supply line 134 is provided and has one end communicated with the fluid supply line 32 and opens into the interior of the seal member 28.

A support sleeve similar to the support sleeve 88 and referred to by the reference numeral 88' is also disposed on the pipe but on the side of the sleeve 68 remote from the sleeve 88. The sleeve 88' supports a cylinder assembly generally referred to by the reference numeral 94' and similar to the assembly 94 and the cylinder assembly 94 is also operatively connected to arcuate shoes or members 114' similar to the arcuate shoes 114. Additionally, the sleeve 88' includes seal means 90' similar to seal means 90 but has a second cylinder assembly generally referred to by the reference numeral 140 secured to the end thereof remote from the support sleeve 68 in any convenient manner such as by welding 142.

The cylinder assembly 140 includes annular opposite end walls 144 and 146 interconnected at their outer peripheral portions by means of a cylindrical wall portion 148 and the end walls 144 and 146 include seal means 150 and 152, respectively, forming fluid-tight seals between the end walls 144 and 146 and the pipe 16. In addition, a compression spring 154 is disposed between the ring 40 and the adjacent end of the sleeve 88' and it may be observed that the sleeve 88' and the cylinder assembly 140 may therefore reciprocate along the support pipe 16 and that the latter may be rotated relative to the sleeve 88' and the cylinder assembly 140. Of course, the compression spring 154 normally yieldingly urges the sleeve 88' away from the sleeve 68.

An annular piston 156 is disposed on the pipe 16 between the rings 42 and 44 and within the cylinder assembly 140 and includes seal means 158 forming a fluid-tight seal between the piston 56 and the cylindrical wall portion 148.

A fluid supply line 158 is provided and opens through the end wall 144 into the area within the cylinder assembly 140 disposed between the end wall 144 and piston 156 at one end. The other end of the fluid supply line 158 extends to the adjacent end of the support pipe 16 and extends through the latter toward the opposite end thereof for connection with a suitable source of fluid under pressure. Still further, another fluid supply line 160 is provided and opens through the end wall 146 into the interior of the cylinder assembly 140 disposed between the end wall 146 and the piston 156 at one end. The other end of the fluid supply line 160 also extends to the adjacent end of the support pipe 16 and then through the latter toward the remote end thereof and connects with any suitable source of fluid under pressure.

It will, of course, be noted that the cylinder assembly 94' is provided with a seal member 128' corresponding to the seal member 128 and serviced by a branch fluid supply line 135' corresponding to the fluid supply line 135 and also that fluid supply lines 132' and 134' corresponding to the fluid supply lines 132 and 134 are provided and are communicated with the interior of the cylinder assembly 94' on opposite sides of the annular piston 102' disposed therein and corresponding to the annular piston 102.

With attention now invited to the lefthand portion of FIGURE 3, there may be seen an inert gas or atmosphere line 164 which extends through the pipe section 14 and between the seal member 128 and the cylindrical wall portion 100. The inert gas line 154 thereby has one end portion communicated with the area disposed between the seal means 128 and 128' and it is to be understood that its other end is operatively communicated with a suitable source of inert gas under pressure.

In operation, the clamp 10 may be first inserted in the pipe section 12 after which the pipe section 14 may be telescoped over the end portion of the clamp 10 projecting outwardly of the section 12. The rollers 56 and 56' will of course support the clamp 10 within the sections 12 and 14 so that the longitudinal center axis of the support pipe 16 substantially coincides with the longitudinal center axes of the sections 12 and 14.

Then, the fluid supply lines 132 and 132' may be actuated to shift the pistons 102 and 102' away from each other within the cylinder assemblies 94 and 94' so as cause the arcuate gripping shoes or members 114 and 114' to frictionally grip the internal surfaces of the sections 12 and 14 at points spaced circumferentially thereabout. In this manner, the pipe sections 12 and 14 will be caused to move into substantially perfect end aligned relation. Thereafter, the fluid line 158 may be actuated to cause the cylinder assembly 140 to shift to the left as viewed in FIGURE 3 of the drawings relative to the piston 156 thereby causing the pipe section 12 to move into end abutted relation with the pipe section 114. Of course, when the lines 132 and 132' were actuated, the seal means 128 and 128' were actuated to completely seal off the interior of the adjacent ends of the sections 12 and 14 from the ambient atmosphere and at this point the inert gas line 164 may be actuated to cause an inert gas or atmosphere to be injected into the area within the sections 12 and 14 disposed between the seal means 128 and 128'.

At this point a suitable apparatus for pressure welding type such as that disclosed in my above-mentioned co-pending application may be utilized to evenly heat the end abutted adjacent ends of the sections 12 and 14 and the support pipe 16 may be caused to rotate relative to the sleeves 50, 50', 88, 88' and the cylinder assembly 140 whereby the support sleeve 68 will be caused to rotate. Thereafter, the fluid supply line 84 may be actuated to cause the rollers 78 rotating about the pipe 16 to move outwardly into rolling engagement with the portions of the sections 12 and 14 adjacent their abutted ends. Then, as the abutted ends of the sections 12 and 14 are heated to temperatures sufficient to support autogeneous fusion of the abutted ends of the sections 12 and 14, the heating of the sections 12 and 14 by the apparatus disclosed in my above-mentioned co-pending application may be terminated and the fluid line 158 may again be actuated to further urge the section 12 toward the section 14 in order that the two sections may have their abutted ends autogeneously welded together. Of course, during the last-mentioned step of shifting the section 12 toward the section 14 the rollers 78 are caused to continuously rotate in contact with the internal surfaces of the sections 12 and 14.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An internal alignment clamp adapted to be utilized in "pressure welding" a pair of generally end aligned and adjacent pipe sections together, said clamp comprising an elongated assembly defining a longitudinal center axis and adapted to be disposed within and overlap the adjacent ends of said sections, opposite end portions of said assembly including gripping means expandable generally radially outwardly of said center axis and adapted to frictionally grip the internal surfaces of said sections and axially align the said adjacent ends, said assembly also including roller means, spaced intermediate said gripping means journalled for rotation about an axis generally paralleling said center axis and mounted for swinging movement concentrically about said center axis so as to be adapted to rollingly engage the inner surfaces of said pipe sections in said adjacent ends thereof after the latter have been shifted into end abutted relation.

2. The combination of claim 1 wherein said assembly includes means operative to relatively shift said gripping means toward each other.

3. The combination of claim 1 wherein said assembly includes seal means disposed on opposite sides of said roller means and adapted to engage the internal surfaces of said sections at points spaced longitudinally thereof from said adjacent ends and form a good fluid tight seal with said internal surfaces and to seal the area of the interiors of said pipe sections disposed between said seal means from the remaining portions of the interiors of said pipe sections.

4. The combination of claim 3 wherein said assembly includes means operative to introduce an inert atmosphere into the area adapted to be sealed by said seal means.

5. The combination of claim 1 wherein said assembly includes means operative to relatively shift said gripping means toward each other, said assembly including seal means disposed on opposite sides of said roller means and adapted to engage the internal surfaces of said sections at points spaced longitudinally thereof from said adjacent ends and form a good fluid tight seal with said internal surfaces and to seal the area of the interiors of said pipe sections disposed between said seal means from the remaining portions of the interiors of said pipe sections.

6. The combination of claim 5 wherein said assembly includes means operative to introduce an inert atmosphere into the area adapted to be sealed by said seal means.

7. The combination of claim 1 wherein said roller means includes operative means to vary the radius of curvature of the arc through which said roller means is swingable.

8. The combination of claim 7 wherein said roller means includes means operative to yieldingly increase said radius of curvature.

9. The combination of claim 8 wherein said assembly includes means adapted to engage the inner surfaces of said pipe sections and initially position said assembly with said center axis generally coinciding with the longitudinal center axes of said pipe sections.

10. An internal alignment clamp adapted to be utilized in "pressure welding" a pair of generally end aligned and adjacent pipe sections together, said clamp comprising an elongated member defining a longitudinal center axis about which said elongated member is adapted to be rotated and adapted to be disposed within and overlap the adjacent ends of said sections, opposite end portions of said elongated member including gripping means journalled thereon and expandable generally radially of said center axis and adapted to frictionally grip the internal surfaces of said sections and axially align said adjacent ends, one of said gripping means being shiftable axially of said elongated member, and means operable to shift said one gripping means axially of said elongated member toward the other gripping means.

11. The combination of claim 10 wherein said elongated member includes roller support means disposed between said gripping means and mounted for rotation with said elongated member, said roller support means including a roller journalled thereon for rotation about an axis generally paralleling said center axis and spaced laterally outwardly therefrom.

12. The combination of claim 11 wherein said roller support means includes means operative to vary the spacing between said axes.

13. The combination of claim 10 wherein said elongated member includes seal means journalled thereon on opposite sides of said roller support means and adapted to engage the internal surfaces of said sections at points spaced longitudinally thereof from said adjacent ends and form a good fluid tight seal with said internal surfaces and to seal the area of the interiors of said pipe sections disposed between said seal means from the remaining portions of the interiors of said pipe sections.

14. The combination of claim 13 wherein said assembly includes means operative to introduce an inert atmosphere into the area adapted to be sealed by said seal means.

15. The combination of claim 10 wherein said elongated member includes means journalled thereon at points spaced longitudinally therealong and adapted to engage the inner surfaces of said pipe sections and initially position said elongated member with said center axis generally coinciding with the longitudinal center axes of said pipe sections.

References Cited
UNITED STATES PATENTS

| | | |
|---|---|---|
| 1,857,802 | 5/1932 | Baker. |
| 2,179,176 | 11/1939 | Dunn. |
| 3,095,844 | 7/1963 | Thieisch. |

RICHARD H. EANES, Jr., *Primary Examiner.*